United States Patent [19]

Nara

[11] Patent Number: 4,625,467

[45] Date of Patent: Dec. 2, 1986

[54] GEAR SHAPER HAVING REPLACEABLE TIP

[75] Inventor: Hyakuro Nara, Osaka, Japan

[73] Assignee: Azumi Manufacturing Co., Ltd., Osaka, Japan

[21] Appl. No.: 758,857

[22] Filed: Jul. 26, 1985

Related U.S. Application Data

[63] Continuation of Ser. No. 557,746, Dec. 5, 1983, abandoned.

[30] Foreign Application Priority Data

Dec. 28, 1982 [JP] Japan .............................. 57-229418

[51] Int. Cl.[4] .................. B24D 7/06; B23F 21/03
[52] U.S. Cl. .................... 51/209 R; 241/294
[58] Field of Search ............ 51/206.4, 206.5, 209 R, 51/287, 206 R, 206 P; 407/35, 42–43, 51–52, 61–62; 241/294

[56] References Cited

U.S. PATENT DOCUMENTS

| | | | |
|---|---|---|---|
| Re. 25,434 | 8/1963 | Christensen | 51/209 R X |
| 2,830,770 | 4/1958 | De Luca | 241/294 X |
| 3,104,453 | 9/1963 | Greenleaf | 407/52 X |
| 3,754,355 | 8/1973 | Hanchett | 51/209 R |
| 3,793,783 | 2/1974 | Paterno, Jr. et al. | 51/206.5 |
| 3,818,561 | 6/1974 | Montana | 407/61 X |

FOREIGN PATENT DOCUMENTS 369989  2/1973  U.S.S.R. .......................... 51/206 P

*Primary Examiner*—Frederick R. Schmidt
*Assistant Examiner*—Debra S. Meislin
*Attorney, Agent, or Firm*—Moonray Kojima

[57] ABSTRACT

A gear shaping tool comprising a circular body, a plurality of seats disposed around the periphery of the body, and a plurality of working tips held on the respective seats, wherein the seats and tips have triangular surfaces for easy and reliable alignment with each other, with a supporting surface connected to the body disposed below each tip. The tips are easily replaceable by simple fixing of a pin or bolt.

1 Claim, 7 Drawing Figures

GEAR SHAPER HAVING REPLACEABLE TIP

This is a continuation of application Ser. No. 557,746, filed Dec. 5, 1983 now abandoned.

BACKGROUND OF THE INVENTION

1. Field of the Invention

This invention relates to a device used for shaping, cutting or grinding gears or the like, and more particularly to such devices wherein the shaping, cutting or grinding element is replaceable.

2. Discussion of the Prior Art

Conventional gear shapers usually have carbide tips which are brazed onto tip seats. Thus, the tip seats and tips are not replaceable or interchangeable, and the entire arrangement must be discarded when the carbide tips wear out. This results in a high cost operation.

Thus, an urgent need exists in the art for a way to reduce gear shaping operations, and more particularly, for a way to interchange and replace simply and readily just the carbide tips.

SUMMARY OF THE INVENTION

Accordingly, an object of the invention is to overcome the aforementioned and other disadvantages and deficiencies of the prior art.

Another object is to provide a gear shaping device which has a replaceable working tip.

A further object is such a device wherein a replaceable tip and its corresponding tip seat are so constructed as to enable secure aligned fitting therebetween.

A still further object is to provide such a device wherein a further support structure is provided to support the working tip in two dimensions.

DETAILED DESCRIPTION OF PREFERRED EMBODIMENTS

Figure 1:
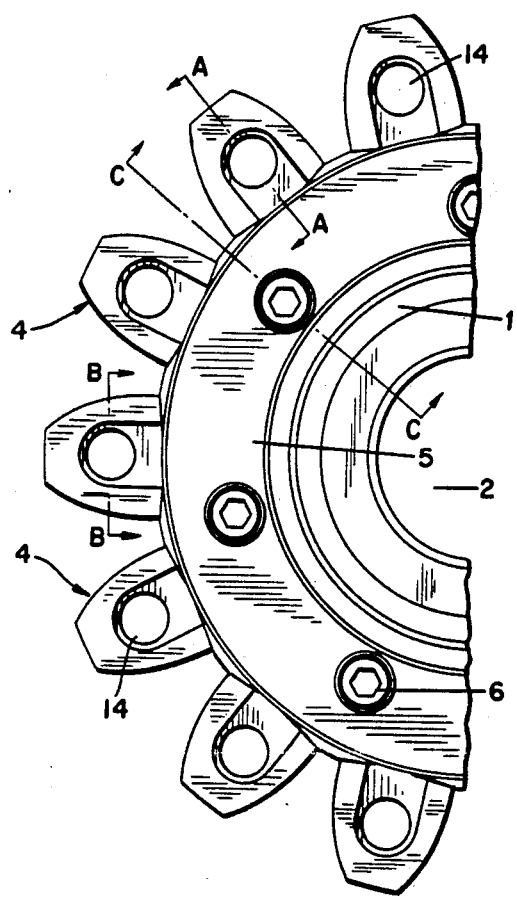
FIG. 1 is a partial front view of an illustrative embodiment of the invention.

Turning now to FIG. 1, there is depicted a pinion type circular gear shaper, cutter or grinder, or the like, comprising a center axis hole 2, for fitting around and movable by, an axis (not shown); a circular seat body or holder 1, on one face of which is attached, such as by pins, bolts or other suitable attaching devices 6, ring 5; and a shaping, cutting or grinding tool or tip 4 (herein also called working tip), connected to tip seat 3 (See FIGS. 2,4) by bolts, pins, or other suitable attaching devices 14.

Figure 2:
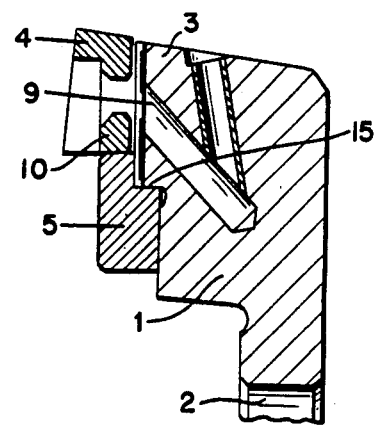
FIG. 2 is a sectional view taken along line A—A in FIG. 1.

Turning now to FIG. 2 (which has pin 14 removed for clarity of description) body 1 has a tip seat 3 attached thereto or made integral therewith, as desired, and tip 4, which comprises a shaping, cutting or grinding surface (as shown more clearly in FIG. 5) and which is attached to a bolt or other attaching device 14 (see FIG. 5) through hole 9. The hole 9 is advantageously positioned to extend through tip seat 3 in a downward angle, as depicted.

Figure 3:
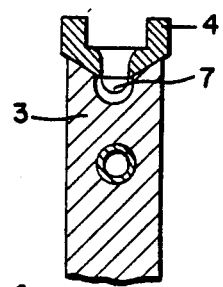
FIG. 3 is a sectional view taken along line B—B in FIG. 1.

FIG. 3 (which also has pin 14 removed for clarity of description) shows an unique feature of the invention, namely, the two angular faces 8 (see FIG. 6) of tip seat 3 and a groove 7 at which the angular faces 8 meet. As shown in greater detail in FIG. 6, the grooves 7 between the faces 8 extend radially to the axis of body 1. Also, the tips 4 have on a back or non-working surface, corresponding angular faces which meet at a common line. Thus, advantageously, the tips 4 can be readily inserted and fixed with its back or non-working surface 11 (having the inclined faces) aligned with the angular faces 8 of tip seat 3.

Figure 4:
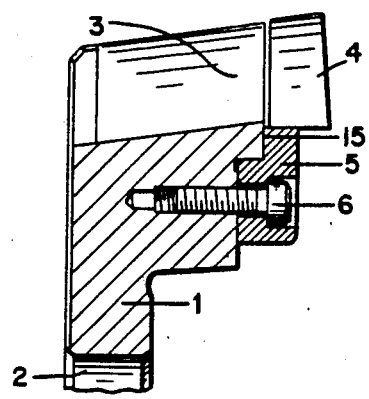
FIG. 4 is a sectional view taken along line C—C in FIG. 1.

Turning now to FIG. 4, and in connection with FIGS. 1 and 2, ring 5 is attached to the front surface (as seen in FIG. 1) of body 1 by means of a bolt, pin or other suitable attaching device 6. Advantageously, body 1 has its front surface shaped to have a stepped portion 15, and similarly ring 5 is shaped in its back surface to have a stepped portion corresponding to stepped portion 15. Thus, when attached by pin 6, ring 5 will be aligned with and fit onto body 1, as depicted. The ring 5 performs and advantageously functions in aligning tip 4 in a radial and transverse manner to tip seat 3, and in holding and providing support for tip 4, when tip 4 is attached to seat 3.

Figure 6:
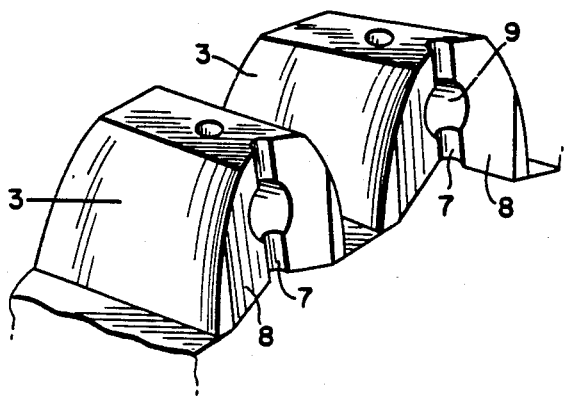
FIG. 6 is an enlarged perspective view of a tip seat.
Figure 7:
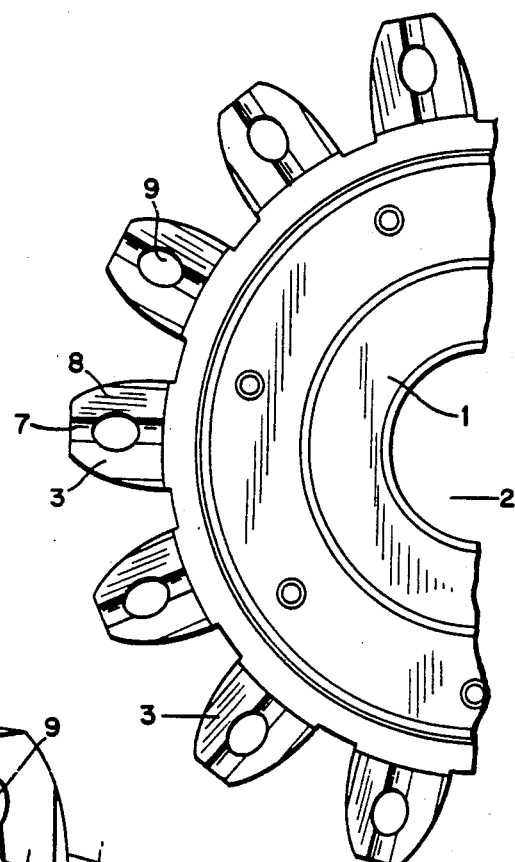
FIG. 7 is a partial front view of the illustrative embodiment with the working tips removed.

Turning now to FIGS. 6 and 7, taken together, there are depicted tip seat 3 on body 1, without any tip 4 attached thereto. The tip seats 3 are attached to body 1 or are integral therewith. In either case, the seats 3 and body 1 can comprise a material which is suitable for holding the tips 4, such as hard steel, alloy steel, and the like. These need not have any shaping, grinding or cutting properties, as would the working surface of tip 4, which may be of carbide or the like.

The seats 3 have at their front surface a pair of faces inclined toward each other toward groove 7, which groove 7 extends radially of body 1, and have a hole 9 to which a pin or bolt 14 may be threaded or otherwise attached when fixing tip 4 to seat 3. Advantageously, faces 8 may be in lines extending radially from the axis or be tilted from the axis as desired. The front faces of seat 3, as seen in FIG. 3, are substantially triangularly disposed. Similarly, the back faces of tips 4, as seen in FIG. 3, are substantially triangularly disposed, and correspond to the disposition of the faces of seat 3.

Figure 5:
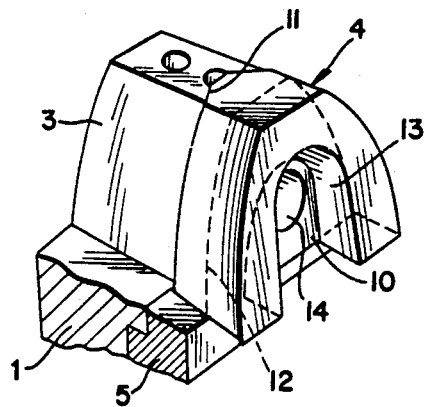
FIG. 5 is an enlarged perspective view of a cutting tip.

Turning now to FIG. 5, there is depicted tip 4 attached to seat 3 on body 1, by means of bolt or pin 14. The tip 4 is supported on ring 5. Advantageously, the back surface 11 of tip 4 has a pair of mutually extending faces which as above described are substantially triangularly disposed, and which can be aligned with the front faces 8 of seat 3. Also, a novel feature of the invention is the structure and composition of tip 4, which comprises back or non-working section 10 (which need not be of a material which has shaping, grinding or cutting properties) and a horseshoe shaped front or work section 13, which has grinding, cutting or shaping properties. The back or non-working section 10 has the triangularly disposed faces 11 or the like, and a flat wall on the front, to which the work section 13 is affixed at surface 12. Advantageously, the work part 13 need only extend beyond the front surface of ring 5, and the back or non-working section 10 extends from the front surface of ring 5 to the back triangular faces 11. Thus, not all of the tip 4 need be made of the working material, and substantial savings result thereby.

Advantageously, when the working surface 13 of tip 4 is used up, that is when surface 13 has been ground down to surface 12 close to the front surface of ring 5, the used tip 4 may be readily and easily and simply removed and discarded, and then replaced with a new tip 4. This is done by first removing bolt 14, then removing tip 4 from seat 3, and then inserting a fresh tip 4 by aligning the back faces 11 with the front faces 8 of seat 3, and placing the bottom of tip 4 against ring 5, and then screwing in bolt 14.

The replacement procedure is simple, fast, and easy to accomplish. The time it takes to make the replacement is very short. The old used tip, comprising only substantially non-working material 10, may be discarded sine the material thereof is relatively inexpensive, as compared to the working material.

The novel seat and tip structures which make possible easy, simple and reliable and accurate alignment of the two pieces, and the support of tip 4 on ring 5, enable the attainment of a commerically feasible replaceable tool piece for use in gear shapers.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A gear shaping tool comprising
   a circular body having a rotational axis, a plane front surface perpendicular to said axis, back surface substantially perpendicular to said axis, and an outer periphery surface, said body further having a stepped portion located toward said outer periphery surface and said stepped portion comprising a plane first surface portion in the same plane as the front surface of said body and a second portion stepped a predetermined distance from said front surface of said body axially toward said back surface of said body;
   a plurality of tip seats, each having a front surface, a back surface, a bottom surface and a top surface;
   means for attaching said bottom surface of said tip seats to and equally spaced along said outer periphery with said front surface of said tip seat facing in an axial direction in the same direction as said front surface of said body and with said back surface of said tip seat facing in an axial direction in the same direction as said back surface of said body, and wherein said front surfaces of said tip seats have substantially V-shaped grooves therein with said V-shaped grooves having a V-shaped bottom channel extending in a direction radially of said axis, said tip seats being disposed so that open top channel parts of said V-shaped grooves face in an axial direction in the same direction as faced by said front surfaces of said tip seats, and wherein said tip seats each further has a hole therein starting from said front surface at said V-shaped groove bottom channel and extending at an oblique angle downward toward said axis;
   a circular ring having an axis, a plane front surface, a back surface and an outer circuclar periphery surface, said back surface having a stepped portion corresponding to and alignable with said stepped portion of said body with said outer periphery surface of the ring extending above said second stepped portion and adjacent said first stepped portion;
   means for attaching said ring to said body with said axis of said body corresponding to and aligned with said axis of said ring, and with said stepped back surface of said ring corresponding to and aligned with said stepped portion of said body with said outer periphery surface of said ring extending in an axial direction from said front surface of said body and located below said tip seats;
   a plurality of replaceable tips, each comprising a horseshoe shaped plane front work surface, a top surface, a bottom surface and a back surface, said back surface having a substantially triangular surface corresponding to and alignable with said V-shaped groove of said tip seats, said bottom surface corresponding to and alignable with said outer periphery surface of said ring, said top surface corresponding to said top surface of said tip seats and wherein said tips each further has a hole disposed therein extending from a front thereof toward said axis at an oblique angle corresponding to said oblique angle of said hole of said tip seat, and alignable therewith; and
   means for replaceably attaching said tips to said tip seats with said triangular back surfaces of said tips aligned with said V-shaped grooves of said front surfaces of said tip seats, and with said bottom surface of said tips being positioned on said outer periphery surface of said ring, and with said holes of said tips being aligned with said bottom of said tip seats, and with said front work surface of said tips extending in an axial direction and outward from said front plane surface of said body, said means for replaceably attaching comprising pins fit into said aligned holes of said tips and said tip seats, thereby to attach said tips to said tip seats in a replaceable manner.

* * * * *